Patented Nov. 29, 1949

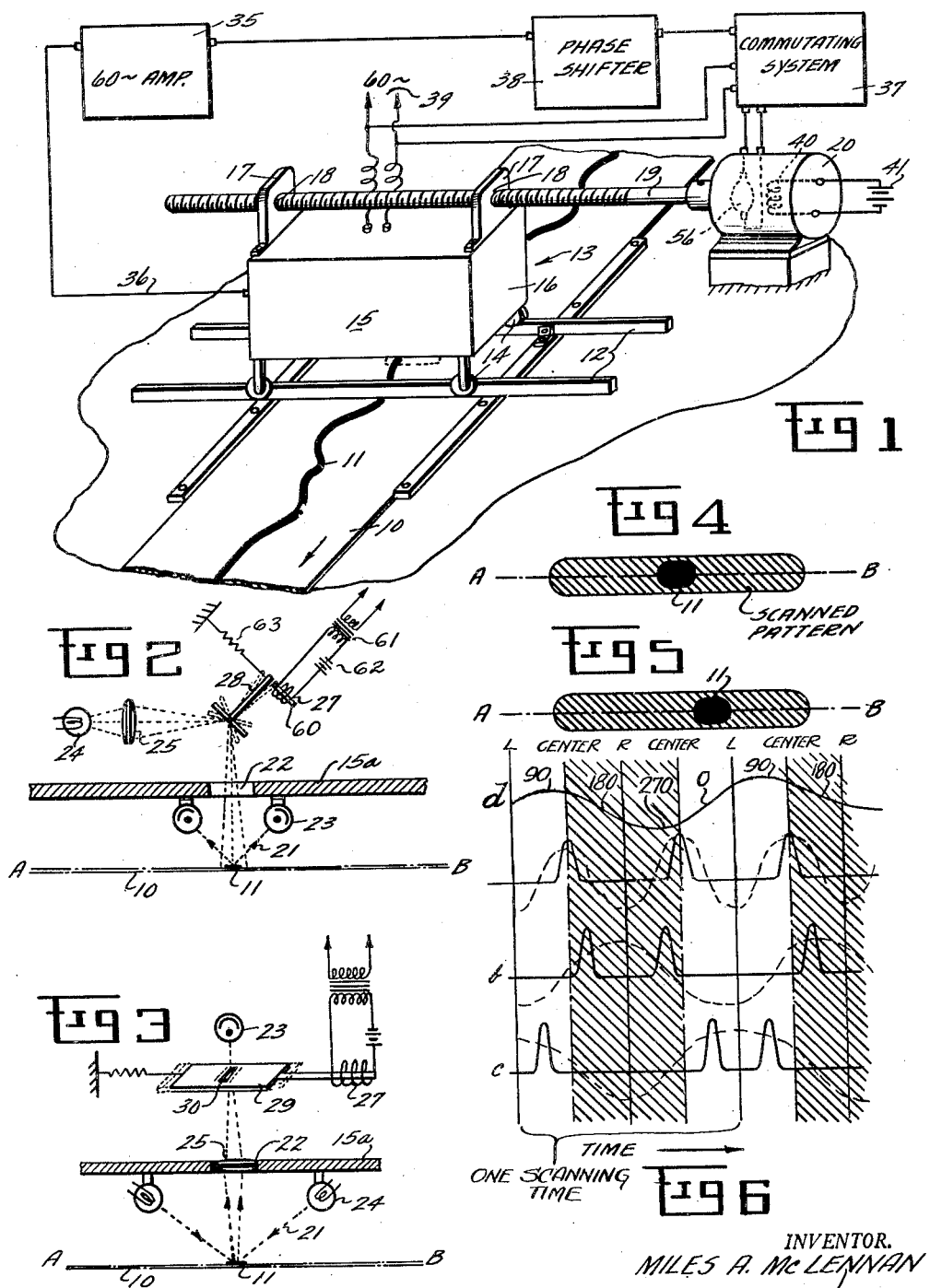

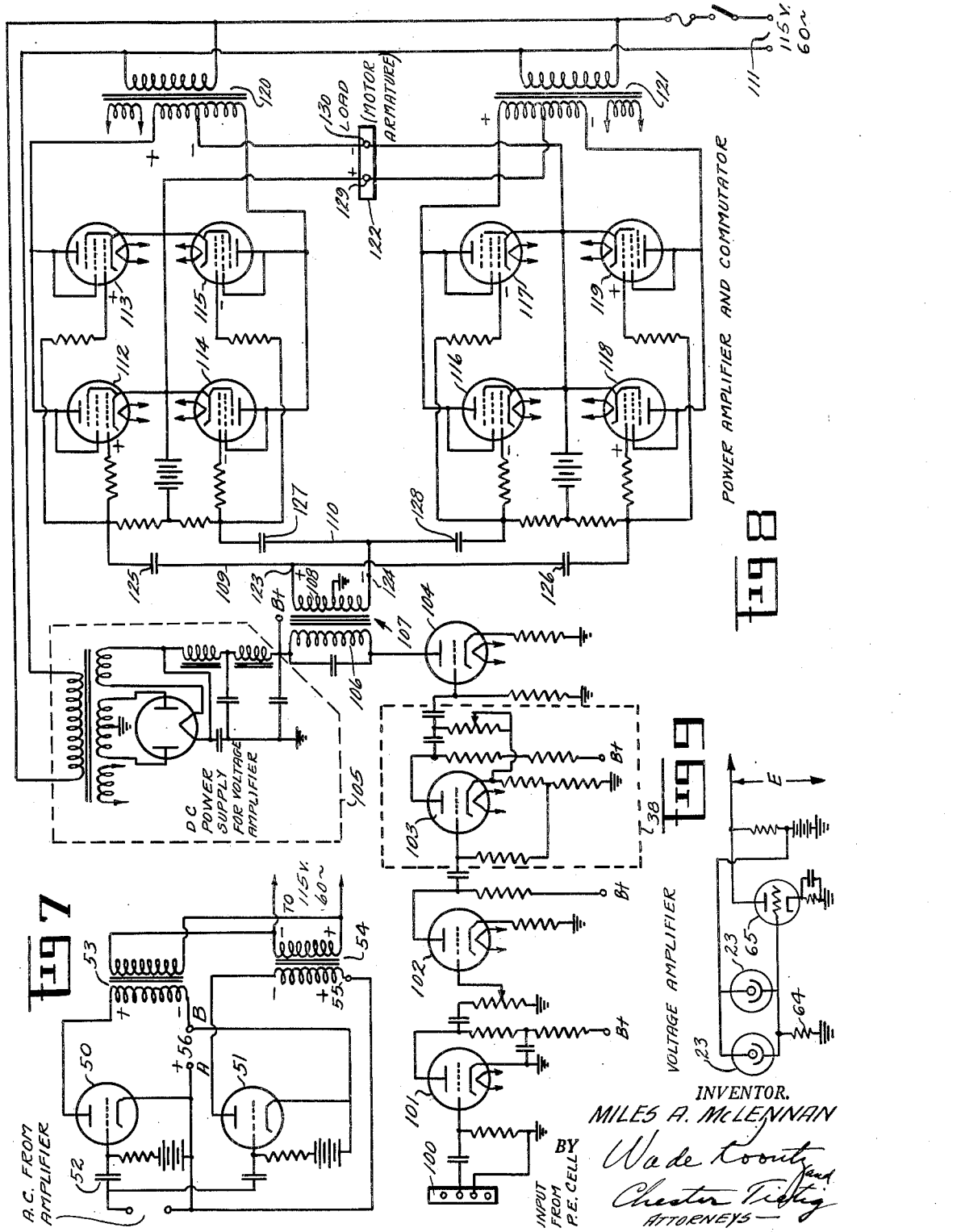

2,489,305

UNITED STATES PATENT OFFICE 2,489,305

PHOTOELECTRIC CURVE FOLLOWING DEVICE

Miles A. McLennan, Dayton, Ohio

Application February 12, 1948, Serial No. 7,905

10 Claims. (Cl. 250—202)

(Granted under the act of March 3, 1883, as amended April 30, 1928; 370 O. G. 757)

The invention described herein may be manufactured and used by or for the Government for governmental purposes without payment to me of any royalty thereon.

This invention relates to a photo-electric following device, specifically a curve follower.

One object of the invention is to provide an apparatus which enables a heavy machine or parts thereof to follow a curve which may be drawn upon a movable paper strip. The invention is therefore applicable to machine tools and the like.

Briefly stated, the subject device is a photoelectric guiding or tracing means wherein a photo-electric scanning system is moved to the right or left of a predetermined position, the electrical output of the scanning system being directed through commutating means operable to move the scanning system to center the scanned segment over the object.

In the drawings, Fig. 1 is a perspective view of my apparatus set up to follow a curve on a moving paper strip. The electric circuit of the apparatus is shown schematically.

Fig. 2 is a diagrammatic representation of the scanning system employing a vibrating mirror.

Fig. 3 corresponds to Fig. 2 except that a vibrating slotted shutter is used.

Fig. 4 is a diagram of the scanned pattern as it is when the apparatus is centered over the curve.

Fig. 5 is a diagram corresponding to Fig. 4 but indicating a condition in which the scanning segment is off center, hence the machine is about to move to center itself.

Fig. 6 is a wave diagram showing the variations in voltage produced during the scanning cycle.

Fig. 7 is a diagram of the commutating system elements and wiring.

Fig. 8 is a diagram of an elaborated form of the circuit shown in Fig. 7, and

Fig. 9 is a diagram of the photoelectric cell circuit as used in Figs. 2 and 3.

In Fig. 1, 10 is a strip or chart of paper or other sheet material which bears a generally centered curved line 11. The strip is continuously and uniformly moved (by means not shown) at a moderate speed, for example in the direction shown by the arrow. Transverse to the chart direction of motion are a pair of ways 12 which are elevated just enough to clear the chart. Upon the ways is mounted a carriage 13 which rolls on anti-friction rollers 14. The carriage comprises a housing 15 which may be of box-like form and be provided with end walls 16 which extend upwardly beyond the housing 15 and forms a pair of tabs 17. The tabs 17 are provided with threaded openings 18 to receive a threaded shaft 19 which is the drive shaft of a reversible electric motor 20. Below the housing 15 is shown in dotted line the path of the scanning ray 21.

Referring now to Fig. 2, 15a is a section of the lower part of the housing 15. An opening 22 is provided in it for the egress of the scanning ray 21. At each side of the opening 22 there is mounted a photo-electric cell 23 so as to receive reflections from the chart 10. The scanning ray originates from an electric lamp 24 and passes through a condensing lens 25 and strikes a mirror 26 which through connection to a ferrous armature 28 will vibrate in the field from an alternating (60 cycle) current winding 27 having a core 60.

The winding 27 is coupled to a source of 60 cycle voltage, which is the same source as is used to energize the rectifiers in Figs. 7 and 8, by means of the transformer 61. A source of direct current 62 is connected in series with the secondary of transformer 61 and the winding 27. The current through the winding 27 therefore has a steady component due to the direct current source 62 and a varying component due to the 60 cycle voltage induced into secondary of transformer 61. The total current in the winding 27 is the sum of these two components, the direct component being the greater of the two, so that the total current is unidirectional and varies between maximum and minimum values. This variation has a frequency of 60 cycles per second and the flux in the core 27, which is in phase with this current, also has the same frequency. This varying flux attracts the armature 28 against the action of spring 63 causing it to oscillate through a small angle once in each 1/60 of a second. The scanning frequency of the light beam is therefore 60 times a second.

In Fig. 3 the ray originates in two lamps 24 which are placed where the photocells 23 were located in Fig. 2. The lens 25 covers the opening 22. The number of photocells 23 is reduced to one which is located where the mirror 26 was placed in Fig. 2. A vibratable shutter 29 in which there is a transverse slit 30 is placed between in the focal plane of lens 25, the photo-cell 23 and the lens 25 and is vibrated by a 60 cycle current from a winding 27. The oscillation of the shutter 29 is accomplished in the same way as the oscillation of the armature 28 in Fig. 2 so that the scanning frequency in this modification is likewise 60 times per second.

Obviously in both constructions i. e. Figs. 2 and 3 a vibrating ray will strike the photocell or photocells 23 after being reflected from the surface of the chart 10. The ray will vibrate at 60 times per second. When it passes over the line 11, if the latter is drawn with a dark medium, no light or so little light will be reflected at that instant that the photocell 23 will not be affected sufficiently to furnish a signal to which the circuit is sensitive. When the ray 21 travels as shown in Fig. 2 and Fig. 3 it follows the paths shown by the arrowheads on the dotted lines When the ray 21 travels an equal distance to the left and right of the line 11 the scanning pattern from the output of the photocell will look like Fig. 4 and when it extends more to the left than to the right, it will look like Fig. 5. The unbalanced condition is used to initiate rotation of the motor 20 to turn the screw 19 in whichever direction will bring the scanning pattern to the appearance shown in Fig. 4.

The photocells in Fig. 2, or the single photocell in Fig. 3, may be included in a circuit such as shown in Fig. 9. When light is falling on the cells 23 a current flows through the resistor 64 which raises the potential of the control grid in tube 65 and lowers the potential E. If the light falling on the cells is suddenly reduced or cut off the potential of the control grid is lowered and the potential E rises. When the scanning pattern is centered over the line as noted in Fig. 4, the output voltage E of the photoelectric cell circuit will have a voltage wave characteristic as shown in Fig. 6, line a. The wave segments in both the R and L (left and right) areas will be equal. If the line 11 moves to the right, giving a scanning pattern as shown in Fig. 5, then the photocell output will have the characteristic shown in Fig. 6, line b with the pips moved into the R area. By a commutating means, the electrical impulses present in the area marked R are utilized to actuate restoring means to move the scanning system to the right until the scanning pattern is centered as in Fig. 4. When the movement is to the left, the wave pattern appears as shown in Fig. 6, line c; then the actuating means moves the scanning system in the corresponding direction. The restoring action is always in that direction which will restore a balance and center the scanning system over the object. Until the limit of the scanning pattern is reached, the greater the distance the line 11 is away from the center of the scanning pattern the greater will be the available restoring action. This is an advantage in reducing hunting or zero position instability.

Referring again to Fig. 1, the electrical system comprises an amplifier 35 adjusted to 60 cycle frequency. The amplifier 35 is supplied with the output 36 of the photoelectric cell or cells 23. The output of the amplifier 35 is supplied to a commutating system 37. A phase shifter 38 capable of 180° shift may be inserted between the amplifier 35 and the commutating system 37 to obtain advantages which will be later discussed. The commutating system is also supplied with standard 60 cycle current from mains 39. The winding 27 is also supplied with current from this source. The output of the commutating system 37 is applied to the motor 20 through its armature 57 as direct current. The prime purpose of the commutating system is to obtain a direct-current flow through the armature of motor 20 to correspond or synchronize with the phase of an alternating voltage which comes from the output of the photoelectric cell.

Figures 7 and 8 show circuits capable of this action. In them, 50 and 51 are triode rectifying vacuum tubes arranged in partial push-pull relation. Their grid circuits are excited from the same source of voltage, i. e. the output of amplifier 35. The grids of rectifying tubes 50 and 51 are therefore connected and in parallel relation. The plate circuits of these tubes 50 and 51 are excitable from two electrically isolated transformer windings 53 and 54 in such a manner that as the A.-C. voltage on the plate of one tube is going positive, the voltage on the other tube is going negative. Such arrangement is conventional.

The armature 56 is connected to the direct current output circuits of rectifiers 50 and 51 in opposite polarity so that when one rectifier is operative current flows through the armature in one direction and when the other rectifier is operative the direction of current flow is reversed. A suitable connection is shown in Fig. 7 in which the cathode of tube 50 returns to point A, a pole of the armature 56. The plate return of that tube connects to pole B of the armature 56 and the plate return is connected to pole A. If the phase of the voltage fed to the tubes 50 and 51 is of such a character that the grids are going positive at the same instant that the plate of the tube 50 is going positive, there will be a current flow through the armature 56 in such a direction that pole A is positive in relation to pole B. No current flows through tube 51 under those conditions. If the phase of the grid voltage is reversed 180°, tube 50 ceases to conduct. Tube 51 will now draw plate current as the grid voltage is in phase with the plate voltage. A current will flow through the load in a direction making pole A negative to pole B. This results in the condition previously mentioned as being desirable, i. e. that the D.-C. flow through the armature 56 corresponds with the phase of an A.-C. voltage. The flow of current through the armature 56 will change in direction as the phase of the A.-C. voltage applied to the grids is reversed.

Referring now more specifically to Fig. 8, the main difference from Fig. 7 is the substitution of a full-wave rectifier employing parallel connected rectifier tubes for each of the half wave rectifier tubes 50 and 51. A full-wave rectifying tube has the advantage in this application, of supplying considerably more direct current output to an inductive load than the half-wave rectifier. Therefore the circuit of Fig. 8 is preferred to that of Fig. 7.

Fig. 8 shows in detail, a voltage amplifier 35 which receives at terminal 100 an input, the source of which is the photoelectric cell system shown in Fig. 9. The arrangement of the first two tubes 101 and 102 of the amplifier 35 is conventional, but the third tube, 103 forms a part of a phase shifter 38. While the inclusion of a phase shifter in the combination claimed is believed to be novel, the phase shifter 38 is per se conventional, so is not further described. The output of the phase shifter is fed to the grid of a final amplifying tube 104. The output of tube 104 is coupled to the input circuit of the rectifying system by transformer 107 which has a center tapped secondary. The primary of this transformer is tuned to 60 cycles by means of a shunt condenser.

Voltage for the operation of the voltage amplifier and the amplifier and commutator is obtained from a D. C. power supply 105, the construction of which is also conventional. Primary power for operation of the power amplifier and commutator is obtained at 115 volts, 60 cycles at mains 111 and is supplied to the plates of the controlled rectifiers 112 to 119 inclusive through transformers 120 and 121. Transformer 120 supplies the first group of four rectifying tubes and transformer 121 supplies the second group of four.

Tubes 112, 113, 114 and 115 act as full wave rectifiers whenever the amplified photocell voltage fed to the grids of these tubes through transformer 107 is in phase with the 60 cycle voltage on the rectifier plates. This action results in a current flow through the load 122 (the armature of motor 20) in one direction. If the phase of the grid voltage reverses 180° in relation to the plate voltage, these rectifier tubes 112 to 115 inclusive cease to supply current to the load. Due to the inter-connection wiring, which will be explained presently, between the first group of rectifier tubes 112, 113, 114 and 115 and the second group 116, 117, 118 and 119, when the respective grid-plate voltages are out of phase in the first group, they will be in phase in the second full wave rectifier tube group 116—119 inclusive. This condition will result in the reversal of current direction for motor rotation.

Thus the control action is obtained through signal voltages fed to the respective tube grids from winding 108 of transformer 107. The motor armature load, which is connected at terminals 129 and 130 is controlled by the phase of the voltage appearing at the secondary terminals 123 and 124 of transformer 107.

At some selected instant the relative polarity of the high voltage rectifier supply windings of isolating transformers 120 and 121 can be identified as noted in Fig. 8.

The plates of vacuum tubes 112 and 113 are connected to the plus indicated terminal of the high voltage winding of transformer 120. The plates of tubes 114 and 115 are connected to the negatively indicated terminal of the same winding. The mid-tap of the winding is connected to terminal 130 of the load. The grids of tubes 112 and 113 are connected to terminal 123 of winding 108 through a D. C. blocking capacitor 125. The grids of tubes 114 and 115 are connected to terminal 124 of winding 107 through D. C. blocking capacitor 127. The cathodes of all tubes 112, 113, 114 and 115 are connected to terminal 129 of the load.

The second group of rectifiers consisting of tubes 116, 117, 118 and 119 are connected to the voltage supply system and load as follows, the plates of 116 and 117 are connected to the plus indicated terminal of the high voltage winding of transformer 121. The plates of 118 and 119 are connected to the negative indicated terminal of the same winding. The mid-tap of the winding is connected to terminals 129—130 of the load. The grids of tubes 116 and 117 are connected through D. C. blocking capacitor 128 to terminal 124 of winding 108 of transformer 107. The grids of tubes 118 and 119 are connected to terminal 123 of winding 108 of transformer 107 through capacitor 126. The cathodes of tubes 116, 117, 118 and 119 are connected to terminal 130 of the load. The field excitation of the reversible drive motor 20 is connected so that when the carriage 13 is at the right of the line 11, the motor drive tends to drive the carriage 13 to the left.

The wiring to the respective grids and plates to the two rectifier groups must be such that when the grid of tubes 112 and 113 are going positive, the plate voltage must also be going positive. Under these same conditions, the grids and plates of tubes 114 and 115 will both be going negative. In the second group tubes 116 and 117 will have their grids going negative at the same time that their plates are going positive.

The benefit resulting from the use of a phase shifter 38 as shown in Fig. 1 arises from its corrective action to vary the phase either slightly more or slightly less than 180° in order to correct small errors in the phase of the signal applied to the grids of the rectifiers as compared with the phase of the anode voltage. The phase shifter 38 should therefore be of a manually adjustable type which will stay adjusted as initially set. By careful original adjustment of the phase, the synchronism of phase can be regulated exactly without a phase shifter, but the use of a phase shifter is desirable because it makes extreme care in design and manufacture unnecessary. Each unit can be individually adjusted with little trouble. Some side shifts of phase through the amplifier and the rest of the system are almost inevitable and these can be taken care of by compensating up to 90°.

It should be noted that in addition to controlling the direction of rotation of the drive motor, this rectifier also provides a control over the speed of rotation.

If the scanning head is slightly displaced to one side of the line, a low amplitude signal is fed through the amplifier system to the rectifier. A greater displacement of the scanning head results in a greater output of the photocell and a greater grid excitation of the rectifier and a consequently greater correcting action.

Conversely as the scanning head approaches the line, the correcting action becomes less and less and drops to zero when the scanning system is centered. This proportional control feature aids in reducing hunting and instability.

The overall operation of the system is as follows: As previously pointed out the scanning rate in the system is the same as the frequency of the power supply voltage, which in this case is 60 cycles per second. A wave representing the 60 cycle per second power supply voltage is shown in Fig. 6 (d). If the line 11 is in the center of the scanning pattern the pulses of voltage E obtained from the output of the circuit in Fig. 9 and supplied to the input 100 of the system shown in Fig. 8 are equally spaced as shown in Fig. 6 (a). With relation to the power supply voltage at (d) the pulses in the wave (a) occur somewhere in the vicinity of the 90° and 270° points. These pulses would occur very near to these points if a high ratio of reactance to resistance existed in the coils of magnet 27 and transformer 61 (Figs. 2 and 3), however, with commercial elements, the departure from the 90° and 270° points may be considerable, as shown. It will be seen later that for best operation of the system the pulses in wave (a) should occur at or near to the 0° and 180° points of the power wave, and it is the function of phase shifter 38 to make the necessary phase adjustment to compensate for the above described undesired phase relation between the power supply voltage and the pulses as they come from the scanner. It will be noted that two complete cycles of the wave at (a) occur for each cycle of the scanning frequency. Therefore, this wave, in accordance with the Fourier analysis of periodic waves, has a fundamental frequency which is twice the scanning frequency or 120 cycles per second and which is illustrated by dotted lines in Fig. 6 (a). Since the transformer 107 in Fig. 8 is resonant to 60 cycles the 120 cycle frequency is discriminated against so that the amount of this frequency applied to the grids of the phase sensitive rectifiers is insufficient to render these tubes operative. Therefore, when the line 11 is in the center of the scanning pattern no current flows through the armature of the motor.

If the line 11 is to the right of the center of the scanning pattern the pulses of voltage E are no longer equally spaced but occur as shown in Fig. 6 (b). It will be noted that in this wave it requires the entire scanning cycle to go through one complete period. Therefore, the fundamental frequency of this wave is the same as the scanning frequency or 60 cycles per second and is illustrated in dotted lines in Fig. 6 (b). Similarly when the line 11 is to the left of the center of the scanning pattern the pulses of voltage E together with the fundamental frequency of this wave will appear as shown in Fig. 6 (c). This wave has the same fundamental frequency as the wave (b), however the pulses are time centered about the left limit rather than the right limit of the scanning pattern. The result is that the fundamental frequency of wave (c) is 180° out of phase with the fundamental frequency of wave (b). Since the transformer 107 is resonant at 60 cycles, both of these fundamental frequencies are readily applied to the phase sensitive rectifiers. By proper adjustment of phase shifter 38 the voltage on the grids of the rectifiers can be made to be exactly in phase, or 180° out of phase, with the voltage on the anodes, which is the condition desired for best operation of the rectifiers. As may be seen from Fig. 6 and the preceding discussion of the phase relation between the wave at (a) and the supply voltage at (d) in this figure, the phase difference between the fundamental frequencies at (b) and (c) and the supply voltage at (d) may depart as much as 90° from the desired difference of 0° or 180°. The phase shifter 38 compensates for this phase error as well as for incidental phase shifts in various parts of the circuit.

It is therefore seen that when the line 11 is in the center of the scanning pattern the rectifiers are inoperative. It is also seen that when the line 11 is not in the center of the scanned pattern a voltage appears across the secondary of the transformer 107, Fig. 8 which is applied to the grids of the two sets of tubes in the phase sensitive rectifier circuit of this figure, and that this voltage shifts in phase by 180° when the line 11 passes from one side of center to the other side of center of the scanning pattern. Since the voltages on the anodes of tubes 112 through 115 are 180° out of phase with the voltages on the corresponding anodes of tubes 116 to 119, the voltage across the secondary of transformer 107 and applied to the grids will cause the grid voltages developed to be in phase with the anode voltages in one set of these tubes only, and the set in which the grid and anode voltages are in phase will be determined by whether the line 11 is to the right or left of center of the scanning pattern. The polarities of the circuits are so arranged that when the line 11 is on one side of center that set of rectifiers becomes operative that causes the motor to rotate in the proper direction to center the scanning pattern on the line 11.

As the line 11 shifts from the center of the scanning pattern the wave form (b) or (c) in Fig. 6 departs more and more from the wave form (a) and therefore the amplitude of the 60 cycle fundamental frequency increases. This causes the voltage on the grids of the rectifiers, and therefore their output currents, to increase as the displacement of the line 11 from the center of the scanning pattern increases, or, in other words, the restoring force exerted by the motor is proportional to the error in following the line 11.

My curve follower is useful for controlling the in and out movement of tool slides on machine tools. Further it may be used to control the movements of a cutting or burning tool (torch) when cams are to be cut out of sheet metal. When used to follow a curved line on a graph, the area lying between the curve and the abcissa may be integrated to find the extent thereof. For such uses, it is necessary that an arm (not shown) be connected from the curve follower at any suitable place thereon to the machine element or the like, which is to be controlled. To provide such an arm and to connect it properly is within the skill of competent engineers. The curve follower is also of value in reproducing physiological and other data obtained by pen writers and slit cameras.

Skilled mechanical and electrical engineers will be able to make many modifications of the device from the description given above. It is to be understood that such modifications do not depart from the spirit of the invention if they come within the scope of the appended claims. Suitable arms (not shown) will of course be provided for the manipulation of machine members to be controlled by the curve follower.

What I claim is:

1. A curve follower for tracking a curve formed by a continuous line having a different light reflecting ability from the adjacent areas on either side thereof and satisfying the requirement that no straight line perpendicular to a given straight reference line intersects the curve at more than one point or is tangent thereto, said follower comprising a carriage, electrical actuating means, reversible by reversing the polarity of a direct voltage applied thereto, associated with said carriage for moving said carriage along a straight line at right angles to the said reference line, means for producing relative motion between said carriage and said curve in a direction parallel to said reference line, photoelectric scanning means mounted on said carriage and arranged to scan along a straight scanning line longer than the width of the line forming said curve and perpendicular to said reference line, said scanning means scanning once over said scanning line in each direction during each scanning cycle and producing an electrical pulse each time the line forming said curve is encountered in each scanning cycle, a source of alternating current power, means for electrically actuating said scanning means from said source so that the scanning frequency is the same as the frequency of said source, a pair of phase sensitive rectifiers each having an input circuit, a direct current output circuit and a control circuit, said rectifiers being operative when the phases of the control and input voltages are the same and inoperative when the phases are opposed, means for applying alternating voltages from said source to the input circuits of said rectifiers in opposite phase, means including amplifying means, phase adjusting means and filter means discriminating against frequencies other than the scanning frequency for applying the output of said scanning means to the control circuits of said rectifiers in the same phase, and means for connecting said direct current output circuits to said actuating means with reversed polarities.

2. A curve follower comprising a movable carriage, means for passing a chart having a curved line to be followed thereon in a direction at right angles to the direction of motion of said carriage, said chart being so constructed that the curved line reflects less light than the remaining portions of the chart, means for scanning said chart in the vicinity of said curved line by means of a spot of light which oscillates along a straight line transverse to the direction of motion of said chart, a photoelectric cell arranged to receive light reflected from said chart, a source of alternating current power, means for actuating said scanning means by alternating current from said source so that the scanning frequency is the same as the frequency of said source, amplifying and phase adjusting means coupled to said photoelectric cell to receive the output therefrom, a pair of identical rectifier circuits, each of said rectifier circuits containing at least one vacuum tube having an anode, a cathode and a control grid, means for applying alternating voltage from said source to the anodes of the vacuum tubes in each rectifier circuit with the corresponding anodes in the two circuits being supplied with voltages 180° out of phase, means tuned to said scanning frequency for applying the output of said amplifying and phase adjusting means to the grids of the tubes in the two rectifier circuits with corresponding grids in the two circuits being supplied with voltages of the same phase, means for biasing the grids of said tubes by such an amount that the anode circuits of said tubes rectify the alternating voltage applied to the anode when the grid and anode voltages are in phase but no rectification occurs when the anode and grid voltages are opposite in phase, direct current operated means associated with said carriage for moving same, said direct current operated means being reversible by reversing the polarity of the voltage applied thereto, and means for applying the output voltages of said pair of rectifier circuits in reversed polarity to said direct current operated means.

3. Apparatus as claimed in claim 2 in which said scanning means comprises means for lighting said chart, a lens system for forming an image of a small length of the curved line to be followed, a shutter having a narrow slit located in the focal plane of said lens system, means for oscillating said shutter at the frequency of said power source and transversely to the direction of motion of said chart, and means positioning said photoelectric cell on the opposite side of said slit from said chart.

4. A curve follower comprising a scanner which is actuated from a source of alternating voltage and for each cycle of said alternating voltage scans through a complete scanning cycle consisting of one scan in each direction along a scanning line at substantially right angles to the general direction of said curve, said scanner producing an electrical pulse each time said line is crossed in said scanning cycle, means for separating from the pulse wave output of said scanner the sine wave component having the same period as the scanning cycle, a pair of grid controlled rectifiers, means for applying alternating voltages from said source to the anodes of said rectifiers in opposite phase, means for applying said separated sine wave component to the grids of said rectifiers in the same phase, means for adjusting the relative phases of said anode and grid voltages to zero phase difference in one rectifier and 180° phase difference in the other rectifier, and means actuated by the direct output currents of said rectifiers for moving said scanner relative to said curve in the direction of said scanning line.

5. Apparatus as claimed in claim 4 in which said curve has a different light reflecting quality from its surrounding area and in which said scanner comprises means for focusing a spot of light on said curve, means actuated by alternating voltage from said source for oscillating said spot of light along said scanning line at the frequency of said voltage, and photo-electric means positioned to receive light from an area including said curve and said scanning line for producing an electrical pulse each time said spot passes over said curve.

6. Apparatus as claimed in claim 4 in which said curve has a different light reflecting property from its surrounding area and in which said scanner comprises means for illuminating an area containing said curve, means for forming an image of a short length of said curve, a shutter located in the plane of said image and containing a slot conforming substantially to the shape of said image, means energized from said source of alternating voltage for oscillating said slot in the direction of said scanning line at the frequency of said voltage, and photo-electric means positioned to receive light passing through said slot whereby an electrical pulse is generated each time said slot passes said image.

7. Apparatus for indicating the position of an object relative to the center of a scan, said apparatus comprising a scanning device which cyclicly scans along a line first in one sense and then in the opposite sense and which produces an electrical pulse each time said object is encountered in the process of scanning, means for selecting from the pulse output of the scanner an odd harmonic component thereof, said harmonic component having the property of reversing its phase as said object moves from one side to the other side of the center of the scan whereby said harmonic component always has one of two opposite phases, and means synchronized with said scanner and recipient of said harmonic component for producing different electrical outputs for said two opposite phases.

8. Apparatus for indicating the position of an object relative to the center of a scan, said apparatus comprising a scanning device which cyclicly scans back and forth along a line and which produces an electrical pulse each time said object is encountered in the process of scanning, means for selecting from the pulse output of the scanner the harmonic component thereof of the scanning frequency, said harmonic component having one of two possible opposite phases depending upon to which side of the center of the scan said object is located, and means synchronized with said scanner and recipient of said harmonic component for producing a direct voltage having one polarity for one of said possible phases and opposite polarity for the other of said possible phases.

9. Apparatus as claimed in claim 8 in which said last-named means is a rectifying device the polarity of the direct output voltage of which is determined by the phase of said harmonic component applied thereto.

10. Apparatus as claimed in claim 8 in which said last-named means comprises a pair of rectifiers, means for applying said harmonic component to said rectifiers with equal amplitudes and opposite phases, means for generating a sine wave voltage of the scanning frequency and synchronized with said scanning device, means for applying said sine wave voltage with equal amplitude and the same phase to said rectifiers, means for adjusting the relative phase of said harmonic component and said sine wave voltage, and means for producing a voltage proportional to the algebraic sum of the rectified output voltages of said rectifiers.

MILES A. McLENNAN.

REFERENCES CITED

The following references are of record in the file of this patent:

UNITED STATES PATENTS

| Number | Name | Date |
| --- | --- | --- |
| 2,246,884 | Johnson | June 24, 1941 |
| 2,262,354 | Cates | Nov. 11, 1941 |
| 2,349,656 | Gullicksen | May 23, 1944 |
| 2,356,567 | Cockrell | Aug. 22, 1944 |